United States Patent
Hwang (10) Patent No.: US 10,091,126 B2
(45) Date of Patent: Oct. 2, 2018

(54) CLOUD SYSTEM, CONTROL METHOD THEREOF, MANAGEMENT SERVER AND CONTROL METHOD THEREOF

(71) Applicant: S-PRINTING SOLUTION CO., LTD., Suwon-si, Gyeonggi-do (KR)

(72) Inventor: Ki-young Hwang, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 144 days.

(21) Appl. No.: 14/479,647

(22) Filed: Sep. 8, 2014

(65) Prior Publication Data
US 2015/0095448 A1    Apr. 2, 2015

(30) Foreign Application Priority Data
Oct. 2, 2013   (KR) .................. 10-2013-0118188

(51) Int. Cl.
| | | |
|---|---|---|
| *H04L 12/911* | (2013.01) | |
| *H04L 12/803* | (2013.01) | |
| *H04L 29/06* | (2006.01) | |
| *H04L 29/08* | (2006.01) | |
| *G06F 9/50* | (2006.01) | |

(52) U.S. Cl.
CPC .............. *H04L 47/70* (2013.01); *G06F 9/505* (2013.01); *H04L 47/125* (2013.01); *H04L 67/2842* (2013.01); *H04L 67/42* (2013.01)

(58) Field of Classification Search
CPC ... H04L 47/70; H04L 67/2842; H04L 47/125; H04L 67/42; G06F 9/5072
See application file for complete search history.

(56) References Cited

U.S. PATENT DOCUMENTS

| | | | | |
|---|---|---|---|---|
| 5,960,035 | A * | 9/1999 | Sridhar | H04L 5/1446 375/219 |
| 7,318,124 | B2 * | 1/2008 | Hama | G06F 11/3452 711/118 |
| 8,825,789 | B2 * | 9/2014 | Muntz | H04L 67/1097 709/213 |
| 9,621,399 | B1 * | 4/2017 | Parakh | H04L 29/06047 |
| 2005/0144414 | A1 * | 6/2005 | Yamamoto | G06F 3/0605 711/170 |
| 2010/0180208 | A1 * | 7/2010 | Kasten | G06F 12/0873 715/745 |
| 2011/0022689 | A1 * | 1/2011 | Piepenbrink | H04L 12/4679 709/221 |
| 2012/0203910 | A1 | 8/2012 | Lan et al. | |

(Continued)

OTHER PUBLICATIONS

Extended European Search Report dated Apr. 11, 2016 in European Patent Application No. 14183249.3.

*Primary Examiner* — Nicholas R Taylor
*Assistant Examiner* — Tania M Pena-Santana
(74) *Attorney, Agent, or Firm* — Staas & Halsey LLP (57) ABSTRACT

A cloud system includes a first application server to perform a user-requested task, a second application server to provide an additional resource to the first application server, a first cache server to provide a caching service to the first application server, a second cache server to provide a caching service to the second application server, and a management server to copy data stored in the first cache server into the second cache server when the second application server provides the additional resource to the first application server.

12 Claims, 11 Drawing Sheets

(56) References Cited

U.S. PATENT DOCUMENTS

| | | | |
|---|---|---|---|
| 2013/0041972 A1* | 2/2013 | Field | H04L 29/08729 709/213 |
| 2013/0225176 A1* | 8/2013 | Kurabayashi | H04W 36/023 455/437 |
| 2014/0149794 A1* | 5/2014 | Shetty | H04L 67/1095 714/20 |
| 2014/0173624 A1* | 6/2014 | Kurabayashi | G06F 9/5083 718/105 |

* cited by examiner

| | | |
|---|---|---|
| Load Balancing: | Yes ▼ | —810 |
| Auto Scaling: | Yes ▼ | —820 |
| Multi Cloud Cache: | Yes ▼ | —830 |
| Copy Initial Cache Data: | Yes ▼ | —840 |

\* Options:  ⊙ High Hit Data —850
　　　　　　 ○ High Hit + Middle Hit Data
　　　　　　 ○ Full Data

CLOUD SYSTEM, CONTROL METHOD THEREOF, MANAGEMENT SERVER AND CONTROL METHOD THEREOF

CROSS-REFERENCE TO RELATED APPLICATIONS

This application claims priority under 35 U.S.C. § 119(a) from Korean Patent Application No. 10-2013-0118188, filed on Oct. 2, 2013, in the Korean Intellectual Property Office, the disclosure of which is incorporated herein by reference in its entirety.

BACKGROUND

1. Field

The present general inventive concept relates to a cloud system, a method of controlling the system, a management server and a method of controlling the server, and more particularly, a cloud system, a method of controlling the system, a management server and a method of controlling the server, capable of copying data, which is stored in one of a plurality of cache servers included in the cloud system, into another cache server.

2. Description of the Related Art

A cloud system refers to a computing system, which allows IT-related services, such as data storage, networking, use of contents, etc., to be used at the same time through a server on the Internet.

The cloud system includes computing environments, in which information is permanently stored in a server on the Internet and temporarily stored in a client, such as an IT device, examples of which may include a desktop computer, a tablet PC, a notebook, a netbook, a smart phone, etc. That is, any information, including document files, image files, audio files, etc., may be stored in the server on the Internet, such that the user can use the information anytime and anywhere, through various types of IT devices.

In other words, the cloud system is a computing service provided in such a manner that a user borrows usage space of computing sources, such as hardware, software, etc., without making these computing sources physically available to the user. In return for this cloud space usage, the user pays for the use, namely, denotes a technology of providing computing resources, which exist in different physical positions, in an integrating manner through a visualization technology. The cloud computing, which is an innovative computing technology providing IT-related services, such as data storage, networking, use of contents, etc., at the same time through a server on an Internet, which is represented as a cloud, is also defined as "a customized out-sourcing service of IT resources using an Internet."

Recently, with an increased use of the cloud system, auto scaling using load balancing, which is an inherent function of the cloud system, is necessarily employed.

Here, the load balancing refers to a technology of distributing data processing requested by users when the requests exceed a resource (i.e., a resource, such as CPU, memory, etc. to execute data processing requests) of an application server, which is executing a task in response to the users' requests in the cloud system.

Also, the auto scaling refers to a technology of processing exceeded user requests in such a manner of allowing another application server to support an insufficient resource.

For example, in auto scaling in when 150 clients request that data processing be performed in a first application server that only includes sufficient resources to execute data processing requests of 100 clients per a unit time, a resource (i.e., a resource, such as CPU, memory, etc. to execute data processing requests) of a second application server in a client system is therefore provided.

Further, a conventional caching service is also applied to a cloud system. The caching service refers to a technology of shortening a response time with respect to a user request in a manner of storing data, which a user frequently searches to find, in a separate cache server, other than a cloud database.

That is, a first cache server supporting a first application server, which has initially performed a task in response to a user's request, stores beforehand contents which the user frequently searches to find. Then, when a user request regarding the contents is input, the first application server accesses the first cache server, instead of the database within the cloud system, to respond to the user request.

Afterwards, data processing requested by a user exceeds a resource of the first application server, a resource of a second application server, which is located in the cloud system, may be provided by load balancing and auto scaling. However, since a second cache server supporting the second application server has not stored information related to the contents frequently searched by the user, a response time with respect to the user request may extend.

That is, since a second cache server supporting the second application server has not stored information related to the contents frequently searched by the user (i.e., contents with a high hit rate), it may take a long time to store information related to a hit rate corresponding to specific data of a user and the data with a high hit rate in the second cache server providing a caching service to the second application server. Accordingly, data is instead received by directly accessing a database via the cloud system, which may also result in an extended response time with respect to a user request.

SUMMARY

The present general inventive concept provides a cloud system, capable of immediately using cache data in such a manner of copying cache data, which is stored in a cache server of an application server, which is executing an initial user's data processing request, into a cache server of another application server, which additionally provides a resource by use of load balancing and auto scaling, and a method of controlling the same.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a cloud system including a first application server to perform a user-requested task, a second application server to provide an additional resource to the first application server, a first cache server to provide a caching service to the first application server, a second cache server to provide a caching service to the second application server, and a management server to copy data stored in the first cache server into the second cache server when the second application server provides the additional resource to the first application server.

The first cache server of the cloud system may store data in a dividing manner into a plurality of groups according to a data hit rate to provide the caching service.

The management server of the cloud system may copy data, belonging to at least one of the plurality of groups, from the first cache server into the second cache server according to a preset option.

The first application server of the cloud system may check whether data corresponding to the user-requested task is stored in the first cache server, and if not, access a cloud database.

The management server of the cloud system may also execute a load balancing function and an auto scaling function when data processing requests exceeding the resource of the first application server are input.

The foregoing and/or other features and utilities of the present general inventive concept may also be achieved by providing a method of controlling a cloud system may include executing by a first application server a user-requested task, providing by a second application server an additional resource when user requests exceeding a resource of the first application server are input, and copying data, stored in a first cache server providing a caching service to the first application server, into a second cache server providing a caching service to the second application server.

The method may further include storing data to provide the caching service in a dividing manner into a plurality of groups according to a hit rate of the data.

The method may further include copying data, belonging to at least one of the plurality of groups, from the first cache server into the second cache server according to a preset option.

The method may further include searching by the first application server to find data corresponding to the user request from the first cache server, and the first application server may access a cloud database when the data corresponding to the user request is not stored in the first cache server.

The method may further include executing by a management server a load balancing function and an auto scaling function when data processing requests exceeding the resource of the first application server are input.

The foregoing and/or other features and utilities of the present general inventive concept may also be achieved by providing a management server of a cloud system, which may include a plurality of application servers to execute users' data processing requests, and a plurality of cache servers to provide caching services to the plurality of application servers, respectively. The management server may include a communicating unit to receive the users' data processing requests, and a controller to copy data, stored in one of the plurality of cache servers, into another cache server.

The controller of the management server may provide a user interface to set an amount of data to be copied from the one of the plurality of cache servers into the another cache server.

The management server may further include a load balancing unit to distribute the users' data processing requests, and an auto scaling unit to provide an additional resource of at least one of the plurality of application servers.

The foregoing and/or other features and utilities of the present general inventive concept may also be achieved by providing a method of controlling a management server of a cloud system, which may include a plurality of application servers to execute users' data processing requests, and a plurality of cache servers to provide caching services to the plurality of application servers, respectively. The method may include receiving the users' data processing requests, and copying data, stored in one of the plurality of cache servers, into another cache server.

The method may further include providing a user interface to set an amount of data to be copied from the one of the plurality of cache servers into the another cache server.

The method may further include distributing the users' data processing requests, and providing an additional resource of at least one of the plurality of application servers.

The foregoing and/or other features and utilities of the present general inventive concept may also be achieved by providing a cloud system, including a first application server to perform user-requested tasks, a first cache server to provide a caching service to the first application server, and a management server to copy data stored in the first cache server into a second cache server corresponding to a second application server when a number of the user-requested tasks exceeds resource limits of the first application server.

When a number of the user-requested tasks exceeds resource limits of the first application server, the second application server may provide an additional resource to the first application server.

The management server may include a communication unit to receive the user-requested task from a user, and a controller to analyze the user-requested task and to control the communication unit to transmit the user-requested task to the first application server.

The controller may include a user interface to set an amount of the data to be copied from the first cache server to the second cache server.

The data to be copied from the first cache server to the second cache server may be set based on a hit rate of the data.

Exceeding the resource limit of the first application server may include at least one of exceeding a central processing unit (CPU) usage limit, exceeding a memory storage limit, and exceeding a random access memory (RAM) limit.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 1:
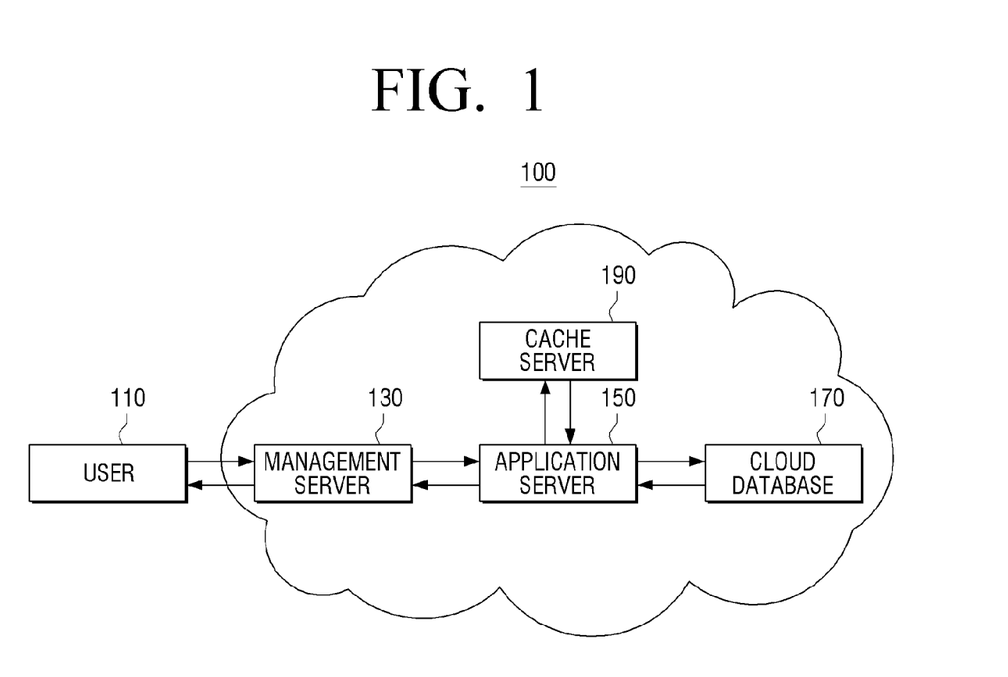
FIG. 1 is a view illustrating a conventional operating method of a cloud system.

FIG. 1 is a view illustrating a conventional operating method of a cloud system 100.

When a user 110 located outside the cloud system 100 inputs a data processing request, then a management server 130 may analyze the data processing request, and transmit the user's request to an application server 150, which provides a service corresponding to the user's request.

The application server 150 may first access a cache server 190 to check whether data corresponding to the user's request is stored in the cache server 190. Afterwards, when there is not the data corresponding to the user's request in the cache server 190, the application server 150 may access a cloud database 170 and receive the data so as to provide a service requested by the user.

Since a response time of the cache server 190 is remarkably shorter than that of the cloud database 170, the application server 150 first accesses the cache server 190, other than the cloud database 170, to check whether the data corresponding to the user's request is present in the cache server 190. Accordingly, the service corresponding to the user's request can be provided faster.

On the other hand, when the data corresponding to the user's request is obtained from the cloud database 170 due to the absence of the corresponding data in the cache server 190, if a hit rate with respect to the corresponding data is high, the data may be stored in the cache server 190.

Therefore, upon receiving a user's request corresponding to the same data at a later time, the application server 150 may obtain the data from the cache server 190, other than taking such data by accessing the cloud database 170. This may result in reduction of the response time.

The operation of the cloud system 100 may be executed in the same manner when requirements to perform data processing by a plurality of users do not exceed a resource of the application server 150.

Here, the resource of the application server 150 refers to a capability, which is required by the application server 150 to execute a user's data processing request, for example, data processing capability of the server, a size of a memory thereof, etc.

However, when data processing requests that exceed the resource of the application server 150 are input by the user, the management server 130 may distribute the data through load balancing, and support a resource of another application server within the cloud system 100 through auto scaling.

Figure 2:
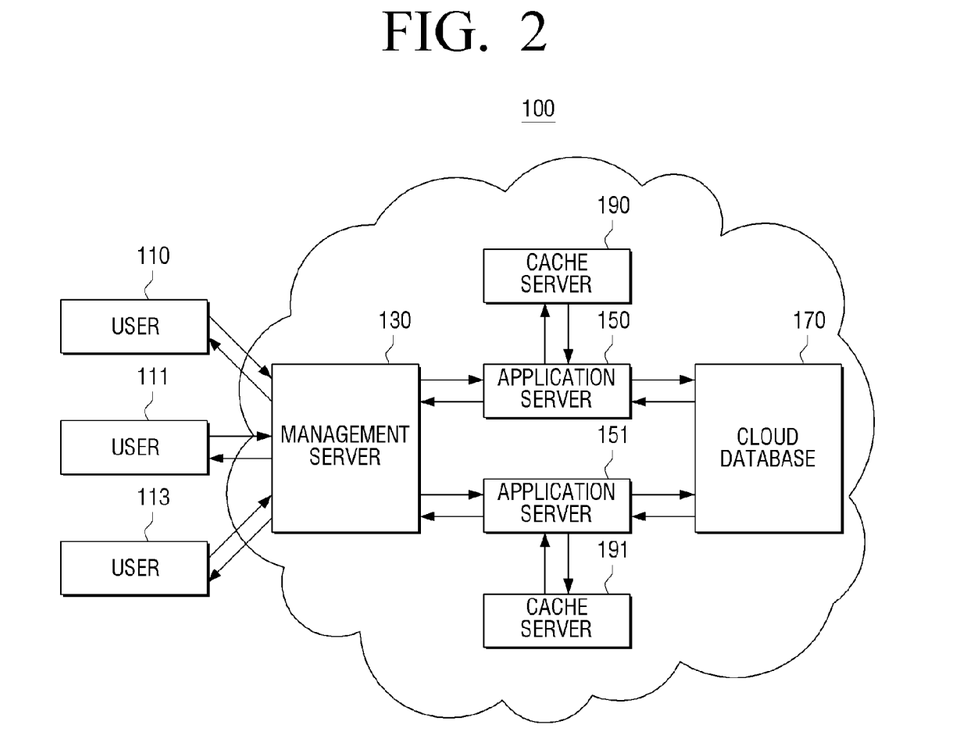
FIG. 2 is a view illustrating conventional auto scaling by load balancing.

FIG. 2 is a view illustrating conventional auto scaling by use of load balancing.

When a large quantity of data processing requests are input by a plurality of users 110, 111 and 113 at the same time, the management server 130 may generate a new application server 151 in an auto scaling manner, and allocate data requests, which exceed the resources of the existing application server 150, to the new application server 151. For example, if a processing speed of the application server 150 is compromised due to an oversaturation of data processing requests, the application server 151 may be alternatively accessed and utilized.

When the new application server 151 is generated in the auto scaling manner, an independent cache server 191 to support it may also be generated. The new application server 151 may access the cloud database 170 to obtain data corresponding to the user requests because any data according to a hit rate is not present in the newly generated cache server 191.

That is, due to the absence of cache data according to a hit rate in the newly generated cache server 191, the new application server 151 should access the cloud database 170. This may extend a response time with respect to the user requests.

Figure 3:
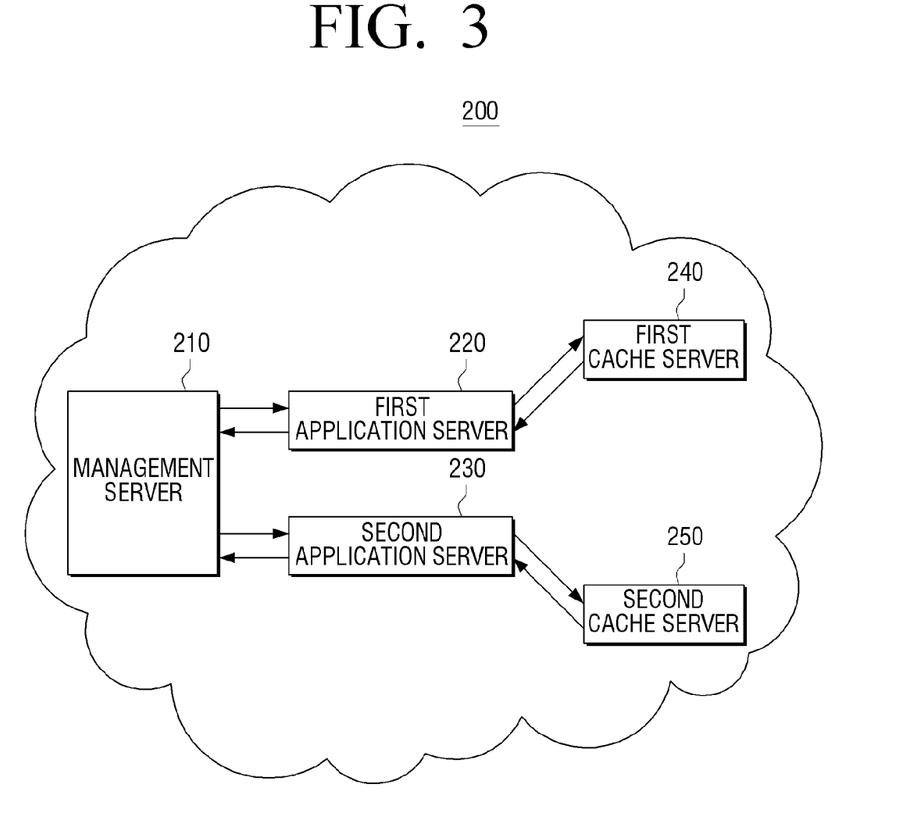
FIG. 3 is a view illustrating a cloud system in accordance with an exemplary embodiment of the present general inventive concept.

FIG. 3 is a view illustrating a cloud system 200 in accordance with an exemplary embodiment of the present general inventive concept.

As illustrated in FIG. 3, the cloud system 200 may include a cloud management server 210, a first application server 220, a second application server 230, a first cache server 240, and a second cache server 250.

The first application server 220 may execute a user-requested task. In detail, the first application server 220 may access a cloud database within the cloud system 200 or a cache server, which supports the first application server 220, in response to the user's data processing request, so as to receive necessary data. The first application server 220 may then provide a service corresponding to the user's data processing request based on the received data.

The second application server 230 may provide an additional resource to the first application server 220. In detail, the second application server 230 may provide the additional resource to the first application server 220 by using load balancing and auto scaling functions of the management server 210.

The second application server 230 may process the data processing requests, which exceed the resource of the first application server 220.

The first cache server 240 may provide a caching service to the first application server 220.

The caching service refers to a technology of shortening a response time with respect to a user request in such a manner of storing data, which the user frequently searches to find, in a separate cache server, other than the cloud database. Similarly, the second cache server 250 may also provide a caching service to the second application server 230.

The management server 210 may analyze a user's data processing request, when the user located outside an area of the cloud system 200 inputs the data processing request, and then transmit the user request to an application server that provides the corresponding service.

Also, when user requests exceeding the application server are input, the management server 210 may divide the user requests by use of the load balancing and auto scaling functions, and generate a new application server, thus to extend the resource of the existing application server.

The management server 210 may copy cache data stored in the first cache server 240 into a newly generated second cache server 250 when the second application server 230 provides the additional resource to the first application server 220 in the auto scaling manner.

Hence, it may not be necessary to access the cloud database to receive specific data until before cache data according to a hit rate with respect to specific data is generated in the second cache server 250. Consequently, the response time with respect to the user request can be reduced.

Figure 4:
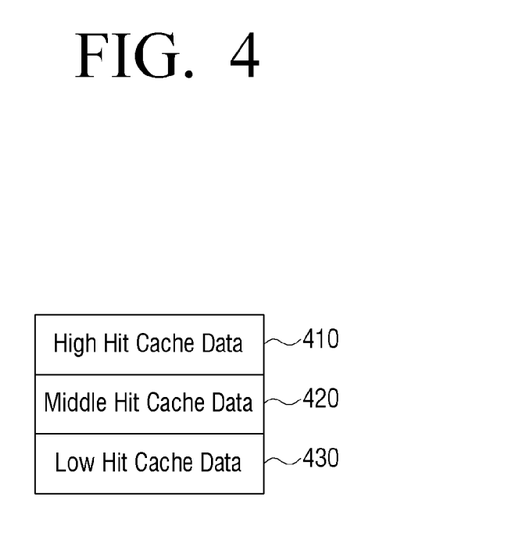
FIG. 4 is a view illustrating a method of storing cache data in a cache server in accordance with an exemplary embodiment of the present general inventive concept.

FIG. 4 is a view illustrating a method of storing cache data in a cache server in accordance with an exemplary embodiment of the present general inventive concept.

The first cache server 240 or the second cache server 250 may store data according to a hit rate to provide the caching service, in a plurality of groups.

The hit rate refers to a rate at which user-desired data is present on a cache server, and data with a high hit rate refers to data that the user frequently accesses.

In accordance with an exemplary embodiment of the present general inventive concept, cache data, which is stored in the first cache server 240 or the second cache server 250, may be stored in a divided manner into three groups of "high hit cache data" 410, "middle hit cache data" 420, and "low hit cache data" 430.

For example, a data with a hit rate more than 90% may belong to the "high hit cache data" group 410, data with a hit rate more than 70% and less than 90% may belong to the "middle hit cache data" group 420, and data with a hit rate less than 70% may belong to the "low hit cache data" group 430 to perform storage of the data.

While FIG. 4 illustrates that the data stored in the first cache server 240 or the second cache server 250 is grouped into the three groups according to the hit rate, more groups or less groups may be alternatively provided to perform storage of the data. Also, a different hit rate may correspond to each group.

Referring to FIG. 4, the reason that the data stored in the first cache server 240 is divided in the plurality of groups to perform the storage of the data is to copy data in groups into the second cache server 250, according to a preset option.

Figure 5:
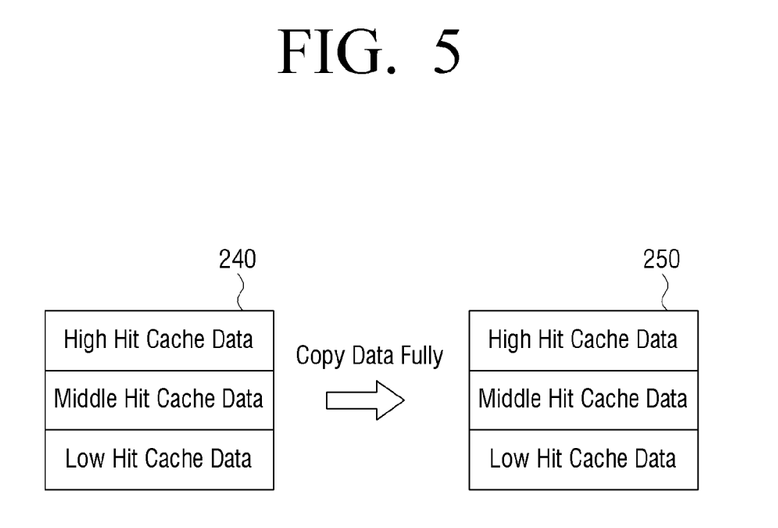
FIGS. 5 through 7 are views illustrating an operation of copying cache data in accordance with an exemplary embodiment of the present general inventive concept.
Figure 6:
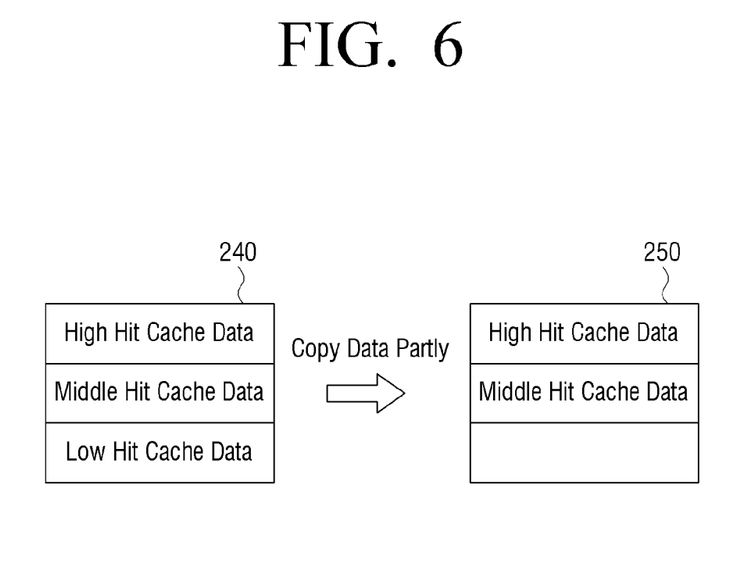
Figure 7:
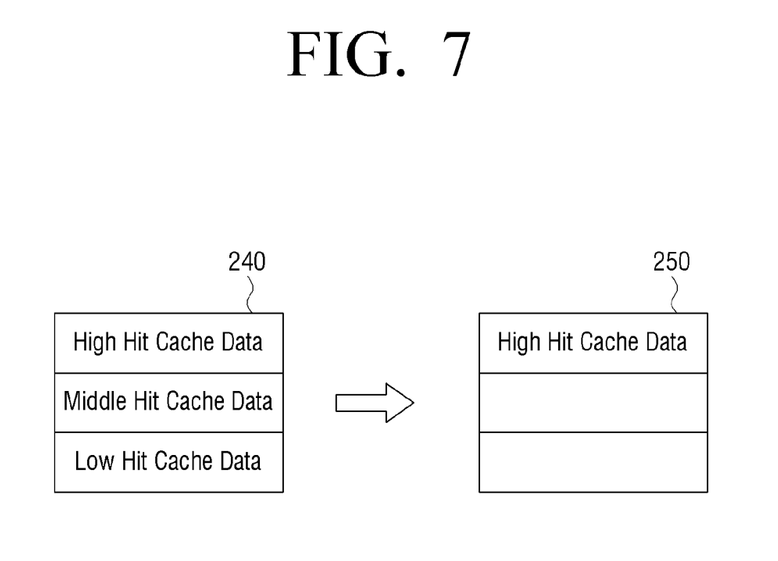

FIGS. 5 through 7 are views illustrating an operation of copying cache data in accordance with an exemplary embodiment of the present general inventive concept.

The user who desires to use the cloud system 200 may access the management server 210 to set an option corresponding to an amount of cache data to be copied from the first cache server 240 into the second cache server 250.

The management server 210 may copy data, which belongs to at least one group, among data stored in the plurality of groups illustrated in FIG. 4, from the first cache server 240 into the second cache server 250 according to the preset option.

FIG. 5 illustrates a case where a user sets all the data stored in the first cache server 240 to be copied into the second cache server 250. As illustrated in FIG. 5, when the user sets the option to "copy data fully," cache data pre-stored in the first cache server 240 may be fully copied into the second cache server 250. In other words, all the data stored in the first cache server 240 is copied into the second cache server 250.

Or, taking a capacity of the newly generated second cache server 250 into account, the cache data stored in the first cache server 240 may be set to be partially copied into the second cache server.

FIG. 6 illustrates that in response to the user setting a "copy data partly" option, only data belonging to the "high hit cache data" group and data belonging to the "middle hit cache data" group, from among the data stored in the first cache server 240, are copied into the second cache server 250.

Or, as illustrated in FIG. 7, only data that belongs to the "high hit cache data" group may be copied into the second cache server 250.

Figure 8:
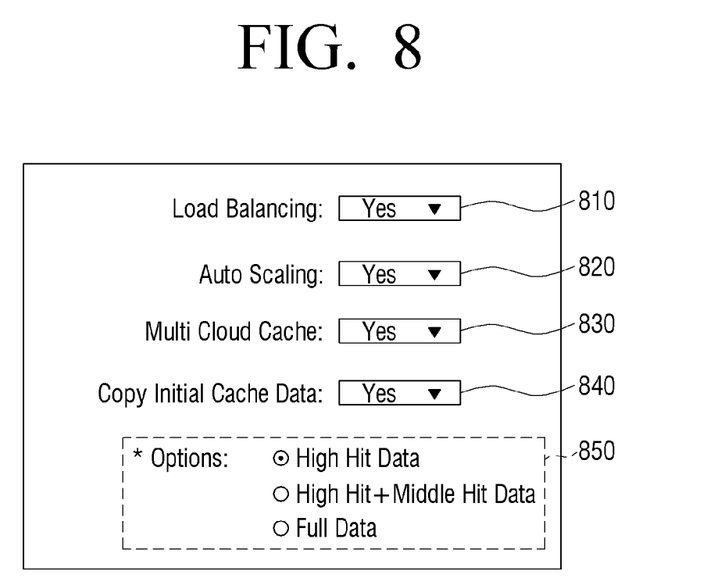
FIG. 8 is a view illustrating a UI to set various options of the cloud system in accordance with an exemplary embodiment of the present general inventive concept.

FIG. 8 is a view illustrating a UI to set various options of the cloud system in accordance with an exemplary embodiment of the present general inventive concept.

The user may set various options by accessing the management server 210 of the cloud system 200. A user interface (UI), which is provided to the user to set the options, may include a load balancing setting window 810, an auto scaling setting window 820, a multi cloud cache setting window 830, and cache data setting windows 840 and 850.

The load balancing setting window 810 and the auto scaling setting window 820 may be windows to set a load balancing function and an auto scaling function of the management server 210, respectively.

When the user applies "YES" to the corresponding load balancing setting window 810 and the auto scaling setting window 820, the load balancing function and the auto scaling function may be executed in response to an input of user requests, which exceed the application server.

The multi cloud cache setting window 830 may be a window to set whether to generate the second cache server 250, which provides a caching service to the second application server 230, when the second application server 230 provides an additional resource according to the auto scaling function. Similarly, when the user applies "YES" to the multi cloud cache setting window 830, the second application server 230 may be generated to provide the additional resource to the first application server 220. Accordingly, the second cache server 250 to provide the caching service to the second application server 230 may also be generated.

Further, a window may be displayed to the user to adjust an amount of cache data that is to be copied from the first cache server 240 into the second cache server 250.

When the user applies "YES" to the "copy initial cache data" window 840, a window 850 to adjust an amount of data to be copied may also be activated.

Accordingly, the user may set which data is to be copied into the second cache server 250, among data belonging to the "high hit cache data" group, data belonging to the "middle hit cache data" group, and data belonging to the "low hit cache data" group.

The exemplary embodiment of the present general inventive concept illustrates setting of windows with respect to which data is to be copied among those data stored in the three aforementioned groups, respectively. However, the present general inventive concept may also be implemented to set the extent of copying data belonging to greater or fewer groups.

Figure 9:
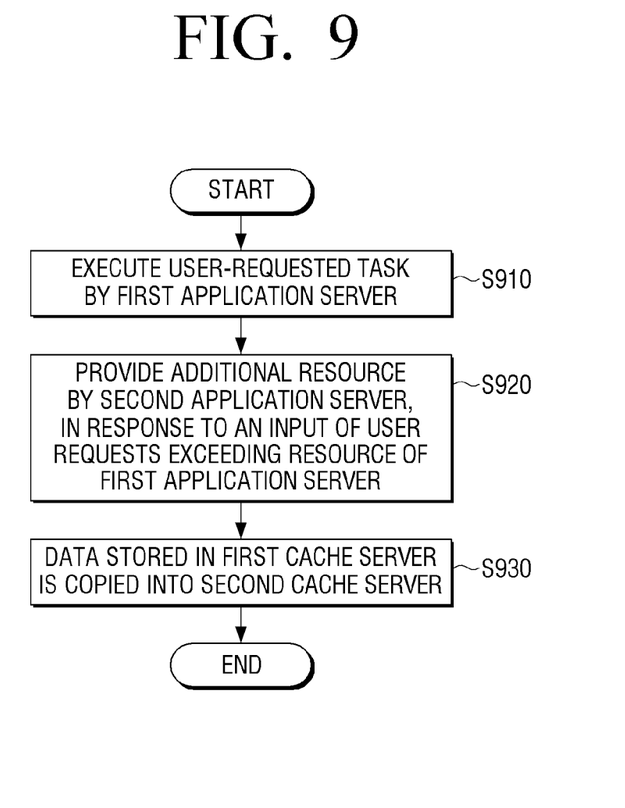
FIG. 9 is a flowchart illustrating a method of controlling a cloud system in accordance with an exemplary embodiment of the present general inventive concept.

FIG. 9 is a flowchart illustrating a method of controlling a cloud system 200 in accordance with an exemplary embodiment of the present general inventive concept.

When external users of the cloud system 200 request to perform data processing, a first application server 220 may execute the user-requested task (S910). Afterwards, when user requests input exceed a resource of the first application server 220, a second application server 230 may provide an additional resource by using load balancing and auto scaling functions (S920).

When a second cache server 250 to provide a caching service to the second application server 230 is also generated, data stored in the first cache server 240 providing the caching service to the first application server 220 may be copied into the second cache server 250 providing a caching service to the second application server 230 (S930).

Figure 10:
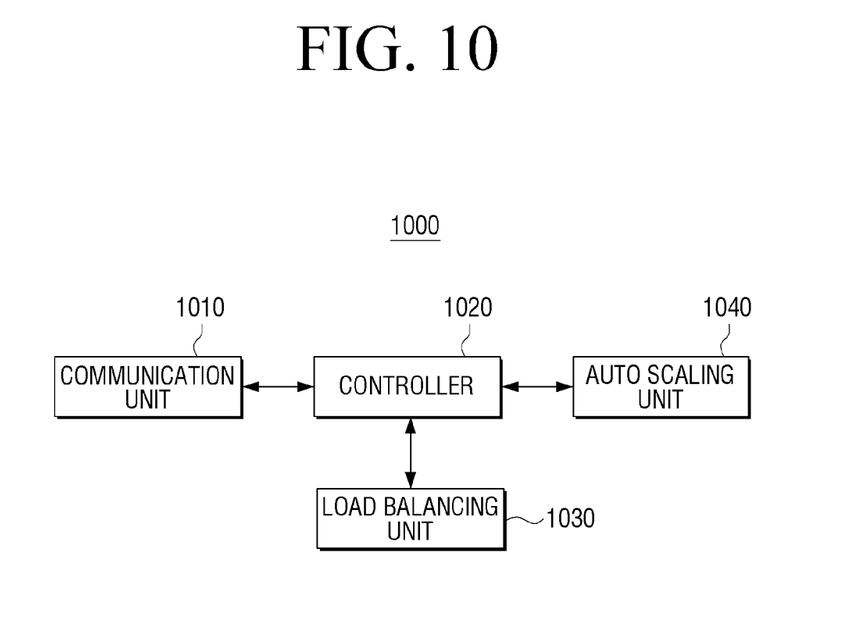
FIG. 10 is a view illustrating a management server in accordance with an exemplary embodiment of the present general inventive concept.

FIG. 10 is a view illustrating a management server 1000 in accordance with an exemplary embodiment of the present general inventive concept.

As illustrated in FIG. 10, the management server 1000 may include a communicating unit 1010 and a controller 1020. The management server 1000 illustrated in FIG. 10 includes components related to this exemplary embodiment of the present general inventive concept. However, the management server 1000 may further include other commonly used components in addition to the components illustrated in FIG. 10.

The management server 1000 illustrated in FIG. 10 may be a management server of a cloud system 200, which includes a plurality of application servers, and a plurality of cache servers to provide caching services to the plurality of application servers, respectively.

The communicating unit 1010 may receive data processing requests from users located outside the cloud system 200. Here, when the data processing requests received exceed a resource of the application server, which performs the users' data processing requests, a load balancing unit 130 may distribute the data processing requests, and an auto scaling unit 140 may provide an additional resource of at least one application server of the plurality of application servers within the cloud system 200.

The controller 1020 may copy data stored in one of the plurality of cache servers into another cache server.

In detail, the auto scaling unit 140 may allow data, which is stored in a cache server providing a caching service to the existing application server, which has executed the data processing requests of users, to be copied into a cache server, which supports a caching service to a newly generated application server.

Also, the controller 1020 may provide a UI to set an amount of data to be copied from one cache server into another cache server, of the plurality of cache servers within the cloud system 200.

For example, when data is stored in the cache server in a dividing manner into a "high hit cache data" group, a "middle hit cache data" group, and a "low hit cache data" group, a UI to set an option with respect to which data is to be copied among data belonging to those groups, respectively.

Figure 11:
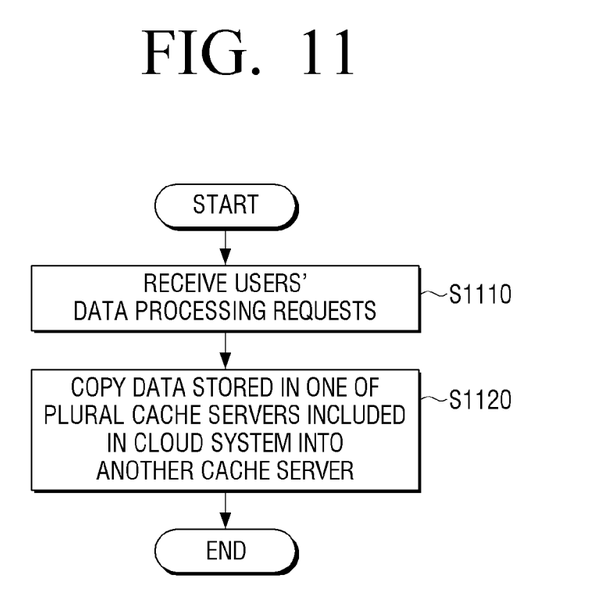
FIG. 11 is a flowchart illustrating a method of controlling a management server in accordance with an exemplary embodiment of the present general inventive concept.

FIG. 11 is a flowchart illustrating a method of controlling a management server in accordance with an exemplary embodiment of the present general inventive concept.

When data processing requests are input by users located outside the cloud system 200, the users' data processing requests may be received (S1110).

Here, when the data processing requests received exceed the resource of the application server, which performs the users' data processing requests, the load balancing unit 1030 may distribute the data processing requests, and the auto scaling unit 1040 may provide an additional resource of at least one application server of the plurality of application servers within the cloud system 200.

Data stored in one of the plurality of cache servers may be copied into another cache server (S1120).

In detail, the auto scaling unit 1040 of FIG. 10 may allow data, which is stored in a cache server providing a caching service to the existing application server, which has executed the data processing requests of users, to be copied into a cache server, which supports a caching service to a newly generated application server.

As described above, according to a cloud system, a control method of the cloud system, a management server and a control method of the management server, when a resource of an application server extends due to load balancing and auto scaling in a cloud system, an application server that provides an additional resource may immediately use cache data, which may result in shortening of a response time with respect to users' data processing requests and allow the users to set an amount of cache data to copy so as to ensure the users' respective autonomies. Also, a problem which may be caused later due to a deletion of cache data can be prevented in advance.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A cloud system, comprising:
 a cloud database;
 a first cache server to store first data in a first group among a first plurality of groups according to a first hit rate of the first data, the first plurality of groups being divided such that each group among the first plurality of groups corresponds to a different hit rate;
 a second cache server to store second data in a second group among a second plurality of groups according to a second hit rate of the second data, the second plurality of groups being divided such that each group among the second plurality of groups corresponds to a different hit rate;
 a first application server to access the first cache server to receive the first data and provide a first service based on the received first data;
 a second application server to access the second cache server to receive the second data and provide a second service based on the received second data; and
 a cloud management server to, when a resource of the first application server is exceeded:
  copy the first data stored in the first group into the second group, the first hit rate of the first group being the same as the second hit rate of the first hit second group,
  perform a control so that the second application server accesses the first data stored in the second cache server when a data processing request for data corresponds to the first data, and so that the second application server accesses the cloud database when the data processing request is for data not stored in the second cache server.

2. The system of claim 1, wherein when the resource of the first application server is not exceeded the first application server is further configured to access the cloud database in response to a data processing request for data not stored in the first cache server.

3. The system of claim 1, wherein the cloud management server is to execute a load balancing function and an auto scaling function when data processing requests cause the resource of the first application server to be exceeded.

4. A method, comprising:
   storing, in a first cache server, first data in a first group among a first plurality of groups according to a first hit rate of the first data, the first plurality of groups being divided such that each group among the first plurality of groups corresponds to a different hit rate;
   storing, in a second cache server, second data in a second group among a second plurality of groups according to a second hit rate of the second data, the second plurality of groups being divided such that each group among the second plurality of groups corresponds to a different hit rate;
   accessing, by a first application server, the first cache server to receive the first data and providing, by the first application server, a first service based on the received first data;
   accessing, by a second application server, the second cache server to receive the second data and providing, by the second application server, a second service based on the received second data; and
   when a resource of the first application server is exceeded:
      copying, by a cloud management server, the first data stored in the first group into the second group, the first hit rate of the first group being the same as the second hit rate hit, of the second group,
      accessing, by the second application server, the first data stored in the second cache server when a data processing request for data corresponds to the first data, and
      accessing, by the second application server, a cloud database when the data processing request is for data not stored in the second cache server.

5. The method of claim 4, further comprising:
   when the resource of the first application server is not exceeded:
      receiving, by the first application server, a data processing request for data not stored in the first cache server,
      accessing, by the first application server, the cloud database to receive the first data not stored in the first cache server, and
      providing the first service based on the data received from the cloud database.

6. The method of claim 4, further comprising executing, by the cloud management server, a load balancing function and an auto scaling function when data processing requests exceeding the resource of the first application server are received.

7. A management server of a cloud system, the management server comprising:
   at least one memory to store instructions; and
   at least one processor to execute the stored instructions to perform operations including:
      receiving a data processing request,
      determining whether the data processing request exceeds a resource of a first application server,
      when the data processing request exceeds the resource of a first application server:
         copying, by the management server, first data stored in a first group among a first plurality of groups in a first cache server, into a second group among a second plurality of groups in a second cache server, the first group and the second group having a same hit rate, the first plurality of groups being divided such that each group among the first plurality of groups corresponds to a different hit rate, and the second plurality of groups being divided such that each group among the second plurality of groups corresponds to a different hit rate,
         performing a control so that a second application server accesses the first data stored in the second cache server when the data processing request is for data corresponding to the first data, and so that the second application server accesses a cloud database when the data processing request is for data not stored in the second cache server.

8. The management server of claim 7, wherein the operations further include receiving a command to copy all of the first plurality of groups from the first cache server into the second cache server or a command to copy some of the first plurality of groups from the first cache server into the second cache server according to hit rates of each of the first plurality of groups.

9. The management server of claim 7, further comprising:
   a load balancer to distribute data processing requests; and
   an auto scaler to provide an additional resource.

10. A method, comprising:
    receiving a data processing request;
    determining whether the data processing request exceeds a resource of a first application server; and
    when the data processing request exceeds the resource of a first application server:
       copying, by a management server, first data stored in a first group among a first plurality of groups in a first cache server, into a second group among a second plurality of groups in a second cache server, the first group and the second group having a same hit rate, the first plurality of groups being divided such that each group among the first plurality of groups corresponds to a different hit rate, and the second plurality of groups being divided such that each group among the second plurality of groups corresponds to a different hit rate, and
       performing a control so that a second application server accesses the first data stored in the second cache server when the data processing request is for data corresponding to the first data, and so that the second application server accesses a cloud database when the data processing request is for data not stored in the second cache server.

11. The method of claim 10, further comprising:
    selectively receiving a command to copy all of the first plurality of groups from the first cache server into the second cache server or a command to copy some of the first plurality of groups from the first cache server into the second cache server according to hit rates of each of the first plurality of groups.

12. The method of claim 10, further comprising:
    distributing data processing requests; and
    providing an additional resource.

* * * * *

UNITED STATES PATENT AND TRADEMARK OFFICE
CERTIFICATE OF CORRECTION

PATENT NO. : 10,091,126 B2
APPLICATION NO. : 14/479647
DATED : October 2, 2018
INVENTOR(S) : Ki-young Hwang Page 1 of 1

It is certified that error appears in the above-identified patent and that said Letters Patent is hereby corrected as shown below:

In the Claims

In Column 10, Line 59, Claim 1, after "the" delete "first hit".

In Column 11, Line 3, Claim 2, after "is" delete "further configured".

In Column 11, Line 35 approx., Claim 4, after "rate" delete "hit,".

Signed and Sealed this
Thirtieth Day of April, 2019

Andrei Iancu
*Director of the United States Patent and Trademark Office*